United States Patent [19]

Fredette

[11] Patent Number: 4,473,540

[45] Date of Patent: Sep. 25, 1984

[54] HIGH EFFICIENCY CHLORINE DIOXIDE PROCESS

[75] Inventor: Maurice C. J. Fredette, Mississauga, Canada

[73] Assignee: ERCO Industries Limited, Islington, Canada

[21] Appl. No.: 511,549

[22] Filed: Jul. 7, 1983

[51] Int. Cl.³ .............................................. C01B 11/06
[52] U.S. Cl. ..................................... 423/479; 423/478
[58] Field of Search ............... 423/477, 478, 479, 551

[56] References Cited

U.S. PATENT DOCUMENTS 2,936,219  5/1960  Rapson ................................. 423/478
4,081,520  3/1978  Swindells et al. ................... 423/478
4,145,401  3/1979  Swindells et al. ................... 423/478
4,154,809  5/1979  Swindells et al. ................... 423/478
4,409,066  10/1983 Reeve et al. ......................... 423/478

FOREIGN PATENT DOCUMENTS 46-40527  11/1971  Japan .................................. 423/478

Primary Examiner—John Doll
Assistant Examiner—Steven Capella
Attorney, Agent, or Firm—Sim & McBurney

[57] ABSTRACT

Chlorine dioxide is formed at high efficiency from a solution of acid sodium chlorate at high sulphuric acid normality to which methanol is fed. The reaction medium is at its boiling point under a subatmospheric pressure. Total acid normality values in the range of about 7 to about 9 normal may be used while high efficiency of chlorine dioxide production is maintained.

14 Claims, No Drawings

HIGH EFFICIENCY CHLORINE DIOXIDE PROCESS

FIELD OF INVENTION

The present invention relates to the production of chlorine dioxide.

BACKGROUND OF THE INVENTION

It is known to produce chlorine dioxide by reduction of an acid aqueous sodium chlorate solution using methanol, as described in U.S. Pat. No. 2,881,052. The process, however, is quite slow, involves the handling of a large volume of liquid effluent and the efficiency of the process is quite low. More recently there issued U.S. Pat. No. 4,081,520, assigned to the assignee hereof, wherein the problems of the prior process were overcome by the use of a single vessel generator-evaporator-crystallizer. The latter process operates at high efficiency, produces no liquid effluent and has an acceptable production rate.

In U.S. Pat. No. 4,081,520, the minimum total acid normality of operability disclosed is 9 normal, since it had previously been found that total acid normality values below such minimum did not give rise to high efficiency. The experiments which lead to such a conclusion were done on a laboratory scale and involved an evaporation rate of 10 to 20 lb of gas phase (water vapour, chlorine dioxide and chlorine)/hr/sq. ft. of surface area of reaction medium.

SUMMARY OF INVENTION

It has now surprisingly been found that, in the process of U.S. Pat. No. 4,081,520, the total acid normality can be decreased below 9 normal and high efficiency of chlorine dioxide production may be maintained. In the process of the present invention, the total acid normality is from about 7 to about 9 normal.

In U.S. Pat. No. 4,081,520, there is data for an experiment conducted at 8 normal sulphuric acid, generated under laboratory conditions using small volumes of generator liquor, and it was only above about 9 normal that highly efficient chlorine dioxide production was achieved. Contrary to this data, it has now been surprisingly found that, under commercial-scale plant conditions, chlorine dioxide may be produced at high efficiency at total acid normality values in the range of about 7 to about 9 normal. At the same time as the increased efficiency at lower acidity was observed, there was also observed a significant increase in the concentration of sodium chloride present in the reaction medium, typically to about 0.2 molar. The difference in behaviour is not satisfactorily explained, but is thought to arise from the substantially larger volume of reaction medium available for reaction under the plant conditions and hence the longer effective residence time and hence more efficient use of the methanol in the reaction medium, leading to decreased evaporative losses.

The larger scale of operation which gives rise to the ability to produce chlorine dioxide highly efficiently at a lower total acid normality also results in a increased evaporation rate in the range of about 50 to about 500 lb gases/hr/sq. ft. of surface area.

GENERAL DESCRIPTION OF INVENTION

The operating parameters of the chlorine dioxide generation process used in the present invention may vary over a wide range. Concentrations of reactants are generally controlled by flow rates of aqueous sodium chlorate solution, sulphuric acid and methanol to the reaction zone, which typically takes the form of a unilocular single vessel generator-evaporator-crystallizer.

The total acid normality of sulphuric acid in the reaction medium is maintained at at least 7 normal and may vary up to about 9 normal. Sulphuric acid generally is fed to the reaction medium in the form of concentrated (93%) sulphuric acid.

The concentration of sodium chlorate in the reaction medium usually varies from about 0.2 to about 1.5 molar, preferably about 0.9 to about 1.1 molar. Sodium chlorate is fed to the reaction medium in the form of an aqueous solution thereof, usually having a concentration of about 5 to about 7 molar.

Under normal operating conditions, chloride ions are present in the reaction medium as a result of in situ reduction of chlorine by the methanol. Sodium chloride may be continuously fed to the reaction medium, if desired, in analogous manner to that disclosed in my copending application Ser. No. 503,786 filed June 13, 1983, the disclosure of which is incorporated herein by reference. The concentration of chloride ions present in the reaction medium when such sodium chloride feed is made is not significantly greater than in the absence of such added sodium chloride, since the added chloride ions are converted to chlorine in the reaction zone. Usually, the chloride ion concentration in the reaction medium varies from about 0.1 to about 0.3 molar.

The chloride ions, when added to the reaction medium, are in the form of an aqueous sodium chloride solution, usually having a concentration of about 5 molar. The sodium chloride may be added as part of the sodium chlorate solution. Hydrochloric acid or hydrogen chloride also may be used to provide the chloride ions to the reaction medium.

The methanol may be fed to the reaction medium in the form of 100% methanol or as an aqueous solution of methanol containing greater than 1% by weight of methanol, although at least about 30% by weight is preferred to avoid excessive water feed to the process.

The reaction temperature usually varies from about 60° to about 90° C., preferably about 70° to about 75° C. Higher temperatures generally lead to faster reaction and hence production rates, but decomposition of chlorine dioxide at excessively high temperatures decreases the yield of chlorine dioxide.

The chlorine dioxide which is present in the gaseous stream produced from the reaction medium in the chlorine dioxide generator is formed into an aqueous solution of chlorine dioxide for use as a bleaching agent, usually by an initial cooling of the gaseous stream to condense a substantial proportion of the steam and a subsequent contact with a water stream in sufficient volume to dissolve all the chlorine dioxide. In the two-stage condensation and dissolution operation, the initial condensation may be effected by cooling to a temperature of about 3° to about 60° C., preferably about 7° to about 60° C. while the subsequent dissolution may be effected by contact of the cooled gas stream from the condensation step with water having a temperature of about 0° to about 22° C., preferably about 3° to about 10° C. Depending on the flow rate of water relative to chlorine dioxide production and the temperatures of condensation and dissolution water, a chlorine dioxide solution is formed having a chlorine dioxide concentration ranging from about 6 to about 20 grams per liter, preferably about 10 to about 15 grams per liter.

When sodium chloride is continuously fed to the reaction medium, chlorine is formed along with the chlorine dioxide. This chlorine is dissolved in the chlorine dioxide solution and is present in an amount from about 0.1 to about 2.0 grams per liter, preferably about 0.1 to about 0.5 grams per liter.

The quantity of sodium chloride or other source of chloride ion, such as, hydrochloric acid, which is added to the reaction medium should not exceed the quantity which coproduces chlorine with the chlorine dioxide beyond the solubility limit of chlorine in the chlorine dioxide solution.

The sodium acid sulphate, which is deposited from the reaction medium, usually is in the form of sodium bisulphate ($NaHSO_4$) or sodium sesquisulphate ($Na_3H(SO_4)_2$). The acid values of this sodium acid sulphate may be recovered therefrom by converting the acid sulphate to neutral sodium sulphate by treatment with water and methanol, as described in U.S. Pat. No. 4,325,934, assigned to the assignee herein, with the sulphuric acid recovered thereby being recycled to the reaction zone. Alternatively, the sodium acid sulphate may be added to the reaction medium of another chlorine dioxide producing process in which sodium chlorate and sodium chloride and/or hydrogen chloride are reacted in an acid aqueous medium at a total acid normality of less than about 4.8 normal, the sodium acid sulphate being used to provide all or part of the acid requirement of such process, as described in U.S. Pat. No. 3,789,108, assigned to the assignee herein.

The sodium acid sulphate usually is removed from the reaction vessel as a slurry with reaction medium, the sodium acid sulphate is separated from the reaction medium, and the reaction medium is recycled to the reaction zone, usually after addition of fresh reactants thereto.

The volume of liquid in the reaction zone and the rate of recycle determine the evaporation rate of gases. In the present invention, the process is effected at an evaporation rate of about 50 to about 500 lb gases (water vapour, chlorine dioxide and chlorine)/hr/sq. ft. of surface area of reaction medium.

Chlorine dioxide is known to be spontaneously explosive at high partial pressures. In the process of U.S. Pat. No. 4,081,520, chlorine dioxide is diluted with steam generated by the boiling of the reaction medium and this steam, combined with a low pressure of operation, typically around 100 mm Hg, maintains the chlorine dioxide below explosive concentrations. At these low pressures, the concentration of chlorine dioxide at the base of the absorption tower wherein the chlorine dioxide is dissolved in water to form the aqueous chlorine dioxide solution, following condensation of the bulk of the steam, remains at a safe level.

The process, however, may be operated at higher but still subatmospheric pressures by introducing sufficient purge air to maintain the partial pressure of chlorine dioxide below about 90 mm Hg. The actual pressure of operation will depend largely on the temperature of the reaction medium, but may vary widely from about 60 to about 400 mm Hg, preferably about 90 to about 190 mm Hg. The ability to modify the pressure of operation by the utilization of a controlled amount of purge air is advantageous in situations where a chlorine dioxide generating plant designed to use the higher subatmospheric pressure, such as when large quantities of chlorine are coproduced with the chlorine dioxide, is used to effect chlorine dioxide formation by reduction of sodium chlorate with methanol.

EXAMPLE

A 14 tons per day capacity chlorine dioxide generator was run wherein acid sodium chlorate solution was reduced with methanol while the reaction medium was boiled under a subatmospheric pressure. Sodium chlorate was continuously fed to the reaction medium as a 5M aqueous solution formed from crystal sodium chlorate at a flow rate of 9.2 USGPM sufficient to maintain a chlorate concentration of 1M in the reaction medium. Sulphuric acid was also continuously fed to the reaction medium as 93% $H_2SO_4$ at a flow rate sufficient to maintain the desired acidity of reaction medium. Methanol was continuously fed to the reaction medium as a 50% w/w aqueous solution at a flow rate of 0.8 USGPM. The average temperature for the generator liquor was about 80° C. and sodium sesquisulphate crystals were removed from the generator.

The generator was run under substantially steady state conditions to produce chlorine dioxide, at varying total acid normality levels. Offgases from the generator were cooled to a temperature of 30° C. to condense the steam and the cooled gases were dissolved in water in an absorption tower using water having a temperature of 10° C. The chemical efficiency of conversion of chlorate ions to chlorine dioxide was determined in each case.

The results are reproduced in the following Table I:

TABLE I

|  | Run No. | | |
| --- | --- | --- | --- |
|  | 1 | 2 | 3 |
| Total Acid Normality (N) | 7.3 to 8.7 | 9 to 10 | 7.8 to 8.8 |
| Length of run (hrs) | 12 | 12 | 8.5 |
| Efficiency (%) | 98% | >99% | >99% |

It will be seen from the results of the above Table I, that high efficiency operation was maintained at total acid normality values below 9 normal.

SUMMARY OF DISCLOSURE

In summary of this disclosure, the present invention relates to improvements in the operability of highly efficient chlorine dioxide processes without adversely affecting that efficiency. Modifications are possible within the scope of the invention.

What I claim is:

1. A continuous process for the production of chlorine dioxide in commercial quantities at high efficiency by reducing sodium chlorate with methanol in an aqueous acid reaction medium, which comprises:

continuously feeding aqueous sodium chlorate solution and sulphuric acid to a boiling aqueous acid reaction medium in a reaction zone maintained under a subatmospheric pressure, said sulphuric acid being fed to the reaction medium to provide a total acid normality in the reaction medium below 9 normal and down to about 7 normal, continuously feeding methanol to the reaction medium in sufficient quantity to form chlorine dioxide from the reaction medium, continuously removing chlorine dioxide from the reaction zone in gaseous admixure with steam and dissolving in water to form and aqueous solution thereof, said reaction medium having a volume which results in an evaporation rate of water therefrom in said reaction zone to about 50 to about 500 lb of gaseous admixture/hr/sq. ft. of surface area of reaction medium, and continuously depositing sodium acid sulphate from the aqueous reaction medium in the reaction zone.

2. The process of claim 1, wherein chloride ions are also continuously fed to the reaction zone in an amount which is no more than that which will produce chlorine in an amount which permits dissolution of the chlorine in the aqueous chlorine dioxide solution.

3. The process of claim 1 wherein said reaction zone is maintained at a subatmospheric pressure of about 60 to about 400 mm Hg at the boiling point of the reaction medium, and sufficient purge air is introduced to the reaction zone to maintain the partial pressure of chlorine dioxide in the gaseous admixture less than about 90 mm Hg.

4. The process of claim 3 wherein said reaction zone is maintained at a subatmospheric pressure of about 90 to about 190 mm Hg.

5. The process of claim 1 wherein said reaction medium has a sodium chloride concentration of about 0.1 to about 0.3 molar.

6. A continuous process for the production of chlorine dioxide in commercial quantities, which comprises:

continuously feeding an aqueous sodium chlorate solution to a reaction zone containing an aqueous acid chlorine dioxide-generating reaction medium to provide a concentration of sodium chlorate in the reaction medium of about 0.2 to about 1.5 molar, continuously feeding sulphuric acid to said reaction medium to provide a total acid normality of below 9 normal down to about 7 normal in said reaction medium, continuously feeding methanol to said reaction medium in sufficient quantity to effect formation of chlorine dioxide from said reaction medium at high efficiency, continuously maintaining said reaction medium at its boiling point at a temperature in the range of about 60° to about 90° C. while a subatmospheric pressure of about 60 to about 400 mm Hg is applied to the reaction zone and the partial pressure of chlorine dioxide is maintained below about 90 mm Hg, continuously withdrawing a gaseous mixture of chlorine dioxide and steam from said reaction zone, boiling said reaction medium at an evaporation rate of about 50 to about 500 lb of gaseous mixture/hr/sq. ft. of surface area of reaction medium, and continuously depositing a sodium acid sulphate from said reaction medium after the reaction medium becomes saturated thereby after the initial start up of the process.

7. The process of claim 6 wherein said reaction medium contains about 0.1 to about 0.3 molar medium chloride.

8. The process of claim 6, including continuously feeding an aqueous solution of chloride ions to said reaction medium to provide a concentration of chloride ions in the reaction medium of about 0.1 to about 0.3 molar, whereby said gaseous mixture withdrawn from the reaction zone contains chlorine.

9. The process of claim 6, wherein the sodium chlorate concentration of the reaction medium is about 0.9 to about 1.1 molar, the reaction temperature is about 70° to about 75° C. and the subatmospheric pressure is about 90 to about 190 mm Hg.

10. The process of claim 6 including forming an aqueous solution of all the chlorine dioxide and chlorine contained in said gaseous mixture.

11. The process of claim 10 wherein said aqueous solution is formed by cooling said gaseous mixture to a temperature of about 3° to about 60° to cause condensation of a substantial proportion of the steam therein and contacting the cooled stream with water having a temperature of 0° to about 22° C. to dissolve all the chlorine dioxide and chlorine and form an aqueous solution containing about 6 to about 20 grams per liter of chlorine dioxide and about 0.1 to about 2.0 grams per liter of chlorine.

12. The process of claim 11, wherein the gaseous mixture is cooled to a temperature of about 7° to about 60° C., the cooled gas stream is contacted with water having a temperature of about 3° to about 10° C., and the aqueous solution contains about 10 to about 15 grams per liter of chlorine dioxide and about 0.1 to about 0.5 grams per liter of chlorine.

13. The process of claim 6 wherein the aqueous sodium chlorate solution is fed to the reaction medium as an aqueous solution having a concentration of about 5 to about 7 molar sodium chlorate.

14. The process of claim 13 wherein the aqueous solution of chloride ions is fed to the reaction medium as an aqueous sodium chloride solution having a concentration of about 5 molar.

* * * * *